(12) United States Patent
Bazakos et al.

(10) Patent No.: US 8,761,458 B2
(45) Date of Patent: Jun. 24, 2014

(54) SYSTEM FOR IRIS DETECTION, TRACKING AND RECOGNITION AT A DISTANCE

(75) Inventors: Michael E. Bazakos, Bloomington, MN (US); Kwong Wing Au, Bloomington, MN (US); George A. Kilgore, Edina, MN (US)

(73) Assignee: Honeywell International Inc., Morristown, NJ (US)

( * ) Notice: Subject to any disclaimer, the term of this patent is extended or adjusted under 35 U.S.C. 154(b) by 181 days.

(21) Appl. No.: 13/077,821

(22) Filed: Mar. 31, 2011

(65) Prior Publication Data

US 2011/0187845 A1  Aug. 4, 2011

Related U.S. Application Data

(63) Continuation of application No. 11/382,373, filed on May 9, 2006, now Pat. No. 8,064,647.

(60) Provisional application No. 60/778,770, filed on Mar. 3, 2006.

(51) Int. Cl.
G06K 9/00 (2006.01)

(52) U.S. Cl.
CPC ........ *G06K 9/00604* (2013.01); *G06K 9/00597* (2013.01); *G06K 9/0061* (2013.01); *G06K 9/00617* (2013.01)
USPC .......................................................... 382/117

(58) Field of Classification Search
USPC .......................................................... 382/117
See application file for complete search history.

(56) References Cited

U.S. PATENT DOCUMENTS

| | | | |
|---|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,543,887 A | 8/1996 | Akashi |
| 5,551,027 A | 8/1996 | Choy et al. |
| 5,572,596 A | 11/1996 | Wildes et al. |
| 5,608,472 A | 3/1997 | Szirth et al. |

(Continued)

FOREIGN PATENT DOCUMENTS

| | | |
|---|---|---|
| EP | 0484076 | 5/1992 |
| EP | 0593386 | 4/1994 |

(Continued)

OTHER PUBLICATIONS

K R Park, Gaze detection by Wide and Narrow View Stereo Camera, CIARP 2004.*

(Continued)

*Primary Examiner* — Chan Park
*Assistant Examiner* — Mark Roz
(74) *Attorney, Agent, or Firm* — Seager, Tufte & Wickhem LLC

(57) ABSTRACT

A stand-off range or at-a-distance iris detection and tracking for iris recognition having a head/face/eye locator, a zoom-in iris capture mechanism and an iris recognition module. The system may obtain iris information of a subject with or without his or her knowledge or cooperation. This information may be sufficient for identification of the subject, verification of identity and/or storage in a database.

9 Claims, 3 Drawing Sheets

(56) References Cited

U.S. PATENT DOCUMENTS

| | | | |
|---|---|---|---|
| 5,664,239 A | 9/1997 | Nakata | |
| 5,671,447 A | 9/1997 | Tokunaga | |
| 5,687,031 A | 11/1997 | Ishihara | |
| 5,717,512 A | 2/1998 | Chmielewski, Jr. et al. | |
| 5,751,836 A | 5/1998 | Wildes et al. | |
| 5,859,686 A | 1/1999 | Aboutalib et al. | |
| 5,860,032 A | 1/1999 | Iwane | |
| 5,896,174 A | 4/1999 | Nakata | |
| 5,901,238 A | 5/1999 | Matsuhita | |
| 5,909,269 A | 6/1999 | Isogai et al. | |
| 5,953,440 A | 9/1999 | Zhang et al. | |
| 5,956,122 A | 9/1999 | Doster | |
| 5,978,494 A | 11/1999 | Zhang | |
| 5,991,429 A | 11/1999 | Coffin et al. | |
| 6,005,704 A | 12/1999 | Chmielewski, Jr. et al. | |
| 6,007,202 A | 12/1999 | Apple et al. | |
| 6,012,376 A | 1/2000 | Hanke et al. | |
| 6,021,210 A | 2/2000 | Camus et al. | |
| 6,028,949 A | 2/2000 | McKendall | |
| 6,055,322 A | 4/2000 | Salganicoff et al. | |
| 6,064,752 A | 5/2000 | Rozmus et al. | |
| 6,069,967 A | 5/2000 | Rozmus et al. | |
| 6,081,607 A | 6/2000 | Mori et al. | |
| 6,088,470 A | 7/2000 | Camus et al. | |
| 6,091,899 A | 7/2000 | Konishi et al. | |
| 6,101,477 A | 8/2000 | Hohle et al. | |
| 6,104,431 A | 8/2000 | Inoue et al. | |
| 6,108,636 A | 8/2000 | Yap et al. | |
| 6,119,096 A | 9/2000 | Mann et al. | |
| 6,120,461 A | 9/2000 | Smyth | |
| 6,134,339 A | 10/2000 | Luo | |
| 6,144,754 A | 11/2000 | Okano et al. | |
| 6,246,751 B1 | 6/2001 | Bergl et al. | |
| 6,247,813 B1 | 6/2001 | Kim et al. | |
| 6,252,977 B1 | 6/2001 | Salganicoff et al. | |
| 6,259,478 B1 | 7/2001 | Hori | |
| 6,282,475 B1 | 8/2001 | Washington | |
| 6,285,505 B1 | 9/2001 | Melville et al. | |
| 6,285,780 B1 | 9/2001 | Yamakita et al. | |
| 6,289,113 B1 | 9/2001 | McHugh et al. | |
| 6,299,306 B1 | 10/2001 | Braithwaite et al. | |
| 6,308,015 B1 | 10/2001 | Matsumoto | |
| 6,309,069 B1 | 10/2001 | Seal et al. | |
| 6,320,610 B1 * | 11/2001 | Van Sant et al. | 348/143 |
| 6,320,612 B1 | 11/2001 | Young | |
| 6,320,973 B2 | 11/2001 | Suzaki et al. | |
| 6,323,761 B1 | 11/2001 | Son | |
| 6,325,765 B1 | 12/2001 | Hay et al. | |
| 6,330,674 B1 | 12/2001 | Angelo et al. | |
| 6,332,193 B1 | 12/2001 | Glass et al. | |
| 6,344,683 B1 | 2/2002 | Kim | |
| 6,370,260 B1 | 4/2002 | Pavlidis et al. | |
| 6,377,699 B1 | 4/2002 | Musgrave et al. | |
| 6,393,136 B1 | 5/2002 | Amir et al. | |
| 6,400,835 B1 | 6/2002 | Lemelson et al. | |
| 6,424,727 B1 | 7/2002 | Musgrave et al. | |
| 6,424,845 B1 | 7/2002 | Emmoft et al. | |
| 6,433,818 B1 | 8/2002 | Steinberg et al. | |
| 6,438,752 B1 | 8/2002 | McClard | |
| 6,441,482 B1 | 8/2002 | Foster | |
| 6,446,045 B1 | 9/2002 | Stone et al. | |
| 6,483,930 B1 | 11/2002 | Musgrave et al. | |
| 6,484,936 B1 | 11/2002 | Nicoll et al. | |
| 6,490,443 B1 | 12/2002 | Freeny, Jr. | |
| 6,493,669 B1 | 12/2002 | Curry et al. | |
| 6,494,363 B1 | 12/2002 | Roger et al. | |
| 6,503,163 B1 | 1/2003 | Van Sant et al. | |
| 6,505,193 B1 | 1/2003 | Musgrave et al. | |
| 6,506,078 B1 | 1/2003 | Mori et al. | |
| 6,508,397 B1 | 1/2003 | Do | |
| 6,516,078 B1 | 2/2003 | Yang et al. | |
| 6,516,087 B1 | 2/2003 | Camus | |
| 6,516,416 B2 | 2/2003 | Gregg et al. | |
| 6,522,772 B1 | 2/2003 | Morrison et al. | |
| 6,523,165 B2 | 2/2003 | Liu et al. | |
| 6,526,160 B1 | 2/2003 | Ito | |
| 6,532,298 B1 | 3/2003 | Cambier et al. | |
| 6,540,392 B1 | 4/2003 | Braithwaite | |
| 6,542,624 B1 | 4/2003 | Oda | |
| 6,546,121 B1 | 4/2003 | Oda | |
| 6,553,494 B1 | 4/2003 | Glass | |
| 6,580,356 B1 | 6/2003 | Alt et al. | |
| 6,591,001 B1 | 7/2003 | Oda et al. | |
| 6,591,064 B2 | 7/2003 | Higashiyama et al. | |
| 6,594,377 B1 | 7/2003 | Kim et al. | |
| 6,594,399 B1 | 7/2003 | Camus et al. | |
| 6,598,971 B2 | 7/2003 | Cleveland | |
| 6,600,878 B2 | 7/2003 | Pregara | |
| 6,614,919 B1 | 9/2003 | Suzaki et al. | |
| 6,652,099 B2 | 11/2003 | Chae et al. | |
| 6,674,367 B2 | 1/2004 | Sweatte | |
| 6,687,389 B2 | 2/2004 | McCartney et al. | |
| 6,690,997 B2 | 2/2004 | Rivalto | |
| 6,708,176 B2 | 3/2004 | Strunk et al. | |
| 6,709,734 B2 | 3/2004 | Higashi et al. | |
| 6,711,562 B1 | 3/2004 | Ross et al. | |
| 6,714,665 B1 * | 3/2004 | Hanna et al. | 382/117 |
| 6,718,049 B2 | 4/2004 | Pavlidis et al. | |
| 6,718,050 B1 | 4/2004 | Yamamoto | |
| 6,718,665 B2 | 4/2004 | Hess et al. | |
| 6,732,278 B2 | 5/2004 | Baird, III et al. | |
| 6,734,783 B1 | 5/2004 | Anbai | |
| 6,745,520 B2 | 6/2004 | Puskaric et al. | |
| 6,750,435 B2 | 6/2004 | Ford | |
| 6,751,733 B1 | 6/2004 | Nakamura et al. | |
| 6,753,919 B1 | 6/2004 | Daugman | |
| 6,754,640 B2 | 6/2004 | Bozeman | |
| 6,760,467 B1 | 7/2004 | Min et al. | |
| 6,765,470 B2 | 7/2004 | Shinzaki | |
| 6,766,041 B2 | 7/2004 | Golden et al. | |
| 6,775,774 B1 | 8/2004 | Harper | |
| 6,785,406 B1 | 8/2004 | Kamada | |
| 6,792,134 B2 | 9/2004 | Chen et al. | |
| 6,793,134 B2 | 9/2004 | Clark | |
| 6,819,219 B1 | 11/2004 | Bolle et al. | |
| 6,829,370 B1 | 12/2004 | Pavlidis et al. | |
| 6,832,044 B2 | 12/2004 | Doi et al. | |
| 6,836,554 B1 | 12/2004 | Bolle et al. | |
| 6,837,436 B2 | 1/2005 | Swartz et al. | |
| 6,845,879 B2 | 1/2005 | Park | |
| 6,853,444 B2 | 2/2005 | Haddad | |
| 6,867,683 B2 | 3/2005 | Calvesio et al. | |
| 6,873,960 B1 | 3/2005 | Wood et al. | |
| 6,896,187 B2 | 5/2005 | Stockhammer | |
| 6,905,411 B2 | 6/2005 | Nguyen et al. | |
| 6,920,237 B2 | 7/2005 | Chen et al. | |
| 6,930,707 B2 | 8/2005 | Bates et al. | |
| 6,934,849 B2 | 8/2005 | Kramer et al. | |
| 6,950,139 B2 | 9/2005 | Fujinawa | |
| 6,954,738 B2 | 10/2005 | Wang et al. | |
| 6,957,341 B2 | 10/2005 | Rice et al. | |
| 6,964,666 B2 | 11/2005 | Jackson | |
| 6,968,457 B2 | 11/2005 | Tam | |
| 6,972,797 B2 | 12/2005 | Izumi | |
| 6,992,562 B2 | 1/2006 | Fuks et al. | |
| 6,992,717 B2 | 1/2006 | Hatano | |
| 7,003,669 B2 | 2/2006 | Monk | |
| 7,017,359 B2 | 3/2006 | Kim et al. | |
| 7,030,351 B2 | 4/2006 | Wasserman et al. | |
| 7,031,539 B2 | 4/2006 | Tisse et al. | |
| 7,043,056 B2 | 5/2006 | Edwards et al. | |
| 7,053,948 B2 | 5/2006 | Konishi | |
| 7,058,209 B2 | 6/2006 | Chen et al. | |
| 7,071,971 B2 | 7/2006 | Elberbaum | |
| 7,076,087 B2 | 7/2006 | Wakiyama | |
| 7,084,904 B2 | 8/2006 | Liu et al. | |
| 7,092,555 B2 | 8/2006 | Lee et al. | |
| 7,095,901 B2 | 8/2006 | Lee et al. | |
| 7,100,818 B2 | 9/2006 | Swaine | |
| 7,113,170 B2 | 9/2006 | Lauper et al. | |
| 7,114,080 B2 | 9/2006 | Rahman et al. | |
| 7,120,607 B2 | 10/2006 | Bolle et al. | |
| 7,125,335 B2 | 10/2006 | Rowe | |
| 7,130,452 B2 | 10/2006 | Bolle et al. | |

(56) References Cited

U.S. PATENT DOCUMENTS

| | | |
|---|---|---|
| 7,130,453 B2 | 10/2006 | Kondo et al. |
| 7,135,980 B2 | 11/2006 | Moore et al. |
| 7,136,581 B2 | 11/2006 | Fujii |
| 7,145,457 B2 | 12/2006 | Spitz et al. |
| 7,146,027 B2 | 12/2006 | Kim et al. |
| 7,152,085 B2 | 12/2006 | Tisse |
| 7,155,035 B2 | 12/2006 | Kondo et al. |
| 7,169,052 B2 | 1/2007 | Beaulieu |
| 7,173,348 B2 | 2/2007 | Voda et al. |
| 7,174,036 B2 | 2/2007 | Ohba |
| 7,177,449 B2 | 2/2007 | Russon et al. |
| 7,181,049 B2 | 2/2007 | Ike |
| 7,183,895 B2 | 2/2007 | Bazakos et al. |
| 7,184,577 B2 | 2/2007 | Chen et al. |
| 7,187,786 B2 | 3/2007 | Kee |
| 7,191,936 B2 | 3/2007 | Smith et al. |
| 7,197,166 B2 | 3/2007 | Jeng |
| 7,197,173 B2 | 3/2007 | Jones et al. |
| 7,203,343 B2 | 4/2007 | Manasse et al. |
| 7,204,425 B2 | 4/2007 | Mosher, Jr. et al. |
| 7,206,431 B2 | 4/2007 | Schuessler |
| 7,215,797 B2 | 5/2007 | Park |
| 7,226,164 B2 | 6/2007 | Abourizk et al. |
| 7,239,726 B2 | 7/2007 | Li |
| 7,269,737 B2 | 9/2007 | Robinson et al. |
| 7,271,839 B2 | 9/2007 | Lee et al. |
| 7,272,380 B2 | 9/2007 | Lee et al. |
| 7,272,385 B2 | 9/2007 | Mirouze et al. |
| 7,277,561 B2 | 10/2007 | Shin |
| 7,277,891 B2 | 10/2007 | Howard et al. |
| 7,280,984 B2 | 10/2007 | Phelan, III et al. |
| 7,287,021 B2 | 10/2007 | De Smet |
| 7,298,873 B2 | 11/2007 | Miller, Jr. et al. |
| 7,298,874 B2 | 11/2007 | Cho |
| 7,305,089 B2 | 12/2007 | Morikawa et al. |
| 7,309,126 B2 | 12/2007 | Mihashi et al. |
| 7,312,818 B2 | 12/2007 | Ooi et al. |
| 7,313,529 B2 | 12/2007 | Thompson |
| 7,315,233 B2 | 1/2008 | Yuhara |
| 7,331,667 B2 | 2/2008 | Grotehusmann et al. |
| 7,333,637 B2 | 2/2008 | Walfridsson |
| 7,333,798 B2 | 2/2008 | Hodge |
| 7,336,806 B2 | 2/2008 | Schonberg et al. |
| 7,338,167 B2 | 3/2008 | Zelvin et al. |
| 7,346,195 B2 | 3/2008 | Lauper et al. |
| 7,346,779 B2 | 3/2008 | Leeper |
| 7,353,399 B2 | 4/2008 | Ooi et al. |
| 7,362,210 B2 | 4/2008 | Bazakos et al. |
| 7,362,370 B2 | 4/2008 | Sakamoto et al. |
| 7,362,884 B2 | 4/2008 | Willis et al. |
| 7,365,771 B2 | 4/2008 | Kahn et al. |
| 7,380,938 B2 | 6/2008 | Chmielewski, Jr. et al. |
| 7,391,865 B2 | 6/2008 | Orsini et al. |
| 7,404,086 B2 | 7/2008 | Sands et al. |
| 7,406,184 B2 | 7/2008 | Wolff et al. |
| 7,414,648 B2 | 8/2008 | Imada |
| 7,417,682 B2 | 8/2008 | Kuwakino et al. |
| 7,418,115 B2 | 8/2008 | Northcott et al. |
| 7,421,097 B2 | 9/2008 | Hamza et al. |
| 7,436,986 B2 | 10/2008 | Caldwell |
| 7,443,441 B2 | 10/2008 | Hiraoka |
| 7,447,911 B2 | 11/2008 | Chou et al. |
| 7,460,693 B2 | 12/2008 | Loy et al. |
| 7,466,348 B2 | 12/2008 | Morikawa et al. |
| 7,467,809 B2 | 12/2008 | Breed et al. |
| 7,471,451 B2 | 12/2008 | Dent et al. |
| 7,472,283 B2 | 12/2008 | Angelo et al. |
| 7,486,806 B2 | 2/2009 | Azuma et al. |
| 7,506,172 B2 | 3/2009 | Bhakta |
| 7,512,254 B2 | 3/2009 | Volkommer et al. |
| 7,518,651 B2 | 4/2009 | Butterworth |
| 7,537,568 B2 | 5/2009 | Moehring |
| 7,538,326 B2 | 5/2009 | Johnson et al. |
| 7,542,945 B2 | 6/2009 | Thompson et al. |
| 7,552,333 B2 | 6/2009 | Wheeler et al. |
| 7,580,620 B2 | 8/2009 | Raskar et al. |
| 7,593,550 B2 | 9/2009 | Hamza |
| 7,639,846 B2 | 12/2009 | Yoda |
| 7,722,461 B2 | 5/2010 | Gatto et al. |
| 7,751,598 B2 | 7/2010 | Matey et al. |
| 7,756,301 B2 | 7/2010 | Hamza |
| 7,756,407 B2 | 7/2010 | Raskar |
| 7,761,453 B2 | 7/2010 | Hamza |
| 7,777,802 B2 | 8/2010 | Shinohara et al. |
| 7,804,982 B2 | 9/2010 | Howard et al. |
| 2001/0026632 A1 | 10/2001 | Tamai |
| 2001/0027116 A1 | 10/2001 | Baird |
| 2001/0047479 A1 | 11/2001 | Bromba et al. |
| 2001/0051924 A1 | 12/2001 | Uberti |
| 2002/0010857 A1 | 1/2002 | Karthik |
| 2002/0039433 A1 | 4/2002 | Shin |
| 2002/0040434 A1 | 4/2002 | Elliston et al. |
| 2002/0062280 A1 | 5/2002 | Zachariassen et al. |
| 2002/0112177 A1 | 8/2002 | Voltmer et al. |
| 2002/0142844 A1 | 10/2002 | Kerr |
| 2002/0150281 A1 | 10/2002 | Cho |
| 2002/0154794 A1 | 10/2002 | Cho |
| 2002/0158750 A1 | 10/2002 | Almalik |
| 2002/0175182 A1 | 11/2002 | Matthews |
| 2002/0186131 A1 | 12/2002 | Fettis |
| 2002/0191075 A1 | 12/2002 | Doi et al. |
| 2002/0191076 A1 | 12/2002 | Wada et al. |
| 2002/0194128 A1 | 12/2002 | Maritzen et al. |
| 2002/0194131 A1 | 12/2002 | Dick |
| 2002/0198731 A1 | 12/2002 | Barnes et al. |
| 2003/0002714 A1 | 1/2003 | Wakiyama |
| 2003/0012413 A1 | 1/2003 | Kusakari et al. |
| 2003/0038173 A1 | 2/2003 | Blackson et al. |
| 2003/0046228 A1 | 3/2003 | Berney |
| 2003/0055689 A1 | 3/2003 | Block et al. |
| 2003/0055787 A1 | 3/2003 | Fujii |
| 2003/0065626 A1 | 4/2003 | Allen |
| 2003/0071743 A1 | 4/2003 | Seah et al. |
| 2003/0072475 A1 | 4/2003 | Tamori |
| 2003/0073499 A1 | 4/2003 | Reece |
| 2003/0074317 A1 | 4/2003 | Hofi |
| 2003/0074326 A1 | 4/2003 | Byers |
| 2003/0080194 A1 | 5/2003 | O'Hara et al. |
| 2003/0092489 A1 | 5/2003 | Veradej |
| 2003/0098776 A1 | 5/2003 | Friedli |
| 2003/0099379 A1 | 5/2003 | Monk et al. |
| 2003/0107097 A1 | 6/2003 | McArthur et al. |
| 2003/0107645 A1 | 6/2003 | Yoon |
| 2003/0115148 A1 | 6/2003 | Takhar |
| 2003/0116630 A1 | 6/2003 | Carey et al. |
| 2003/0118212 A1 | 6/2003 | Min et al. |
| 2003/0125054 A1 | 7/2003 | Garcia |
| 2003/0125057 A1 | 7/2003 | Pesola |
| 2003/0126560 A1 | 7/2003 | Kurapati et al. |
| 2003/0131245 A1 | 7/2003 | Linderman |
| 2003/0133597 A1 | 7/2003 | Moore et al. |
| 2003/0140235 A1 | 7/2003 | Immega et al. |
| 2003/0140928 A1 | 7/2003 | Bui et al. |
| 2003/0141411 A1 | 7/2003 | Pandya et al. |
| 2003/0149881 A1 | 8/2003 | Patel et al. |
| 2003/0152251 A1 | 8/2003 | Ike |
| 2003/0156741 A1 | 8/2003 | Lee et al. |
| 2003/0158762 A1 | 8/2003 | Wu |
| 2003/0158821 A1 | 8/2003 | Maia |
| 2003/0159051 A1 | 8/2003 | Hollnagel |
| 2003/0163739 A1 | 8/2003 | Armington et al. |
| 2003/0169334 A1 | 9/2003 | Braithwaite et al. |
| 2003/0174049 A1 | 9/2003 | Beigel et al. |
| 2003/0177051 A1 | 9/2003 | Driscoll et al. |
| 2003/0182151 A1 | 9/2003 | Taslitz |
| 2003/0182182 A1 | 9/2003 | Kocher |
| 2003/0189480 A1 | 10/2003 | Hamid |
| 2003/0189481 A1 | 10/2003 | Hamid |
| 2003/0191949 A1 | 10/2003 | Odagawa |
| 2003/0194112 A1 | 10/2003 | Lee |
| 2003/0210139 A1 | 11/2003 | Brooks et al. |
| 2003/0225711 A1 | 12/2003 | Paping |
| 2003/0236120 A1 | 12/2003 | Reece et al. |
| 2004/0002894 A1 | 1/2004 | Kocher |

(56) References Cited

U.S. PATENT DOCUMENTS

| | | |
|---|---|---|
| 2004/0005078 A1 | 1/2004 | Tillotson |
| 2004/0006553 A1 | 1/2004 | de Vries et al. |
| 2004/0010462 A1 | 1/2004 | Moon et al. |
| 2004/0025030 A1 | 2/2004 | Corbett-Clark et al. |
| 2004/0025053 A1 | 2/2004 | Hayward |
| 2004/0030930 A1 | 2/2004 | Nomura |
| 2004/0037450 A1 | 2/2004 | Bradski |
| 2004/0039914 A1 | 2/2004 | Barr et al. |
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0117636 A1 | 6/2004 | Cheng |
| 2004/0133804 A1 | 7/2004 | Smith et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0172541 A1 | 9/2004 | Ando et al. |
| 2004/0193893 A1 | 9/2004 | Braithwaite et al. |
| 2004/0233038 A1 | 11/2004 | Beenau et al. |
| 2004/0252866 A1 | 12/2004 | Tisse et al. |
| 2004/0255168 A1 | 12/2004 | Murashita et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |
| 2005/0052566 A1 | 3/2005 | Kato |
| 2005/0055582 A1 | 3/2005 | Bazakos et al. |
| 2005/0063567 A1 | 3/2005 | Saitoh et al. |
| 2005/0084137 A1 | 4/2005 | Kim et al. |
| 2005/0084179 A1 | 4/2005 | Hanna et al. |
| 2005/0102502 A1 | 5/2005 | Sagen |
| 2005/0125258 A1 | 6/2005 | Yellin et al. |
| 2005/0129286 A1 | 6/2005 | Hekimian |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0210267 A1 | 9/2005 | Sugano et al. |
| 2005/0210270 A1 | 9/2005 | Rohatgi et al. |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1 | 5/2006 | Cheng et al. |
| 2006/0147094 A1 | 7/2006 | Yoo |
| 2006/0165266 A1 | 7/2006 | Hamza |
| 2006/0274919 A1 | 12/2006 | LoIacono et al. |
| 2007/0036397 A1 | 2/2007 | Hamza |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0206840 A1 | 9/2007 | Jacobson |
| 2007/0211924 A1 | 9/2007 | Hamza |
| 2007/0274570 A1 | 11/2007 | Hamza |
| 2007/0274571 A1 | 11/2007 | Hamza |
| 2007/0286590 A1 | 12/2007 | Terashima |
| 2008/0005578 A1 | 1/2008 | Shafir |
| 2008/0075334 A1 | 3/2008 | Determan et al. |
| 2008/0075441 A1 | 3/2008 | Jelinek et al. |
| 2008/0075445 A1 | 3/2008 | Whillock et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2008/0267456 A1 | 10/2008 | Anderson |
| 2009/0046899 A1 | 2/2009 | Northcott et al. |
| 2009/0092283 A1 | 4/2009 | Whillock et al. |
| 2009/0316993 A1 | 12/2009 | Brasnett et al. |
| 2010/0002913 A1 | 1/2010 | Hamza |
| 2010/0033677 A1 | 2/2010 | Jelinek |
| 2010/0034529 A1 | 2/2010 | Jelinek |
| 2010/0142765 A1 | 6/2010 | Hamza |
| 2010/0182440 A1 | 7/2010 | McCloskey |
| 2010/0239119 A1 | 9/2010 | Bazakos et al. |
| 2010/0315500 A1 | 12/2010 | Whillock et al. |
| 2010/0316263 A1 | 12/2010 | Hamza |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |

(56) References Cited

FOREIGN PATENT DOCUMENTS

| | | |
|---|---|---|
| JP | 2001222661 | 8/2001 |
| JP | 2001292981 | 10/2001 |
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |
| JP | 2002271689 | 9/2002 |
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

AOptix Technologies, "Introducing the AOptix InSight 2 Meter Iris Recognition System," 6 pages, 2010.

Avcibas et al., "Steganalysis Using Image Quality Metrics," IEEE Transactions on Image Processing, vol. 12, No. 2, pp. 221-229, Feb. 2003.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Bonney et al., "Iris Pattern Extraction Using Bit Planes and Standard Deviations," IEEE, pp. 582-586, 2004.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Camus et al., "Reliable and Fast Eye Finding in Close-up Images," IEEE, pp. 389-394, 2002.

(56) References Cited

OTHER PUBLICATIONS

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.
Chen et al., "Localized Iris Image Quality Using 2-D Wavelets," LNCS vol. 3832, pp. 373-381, 2005.
Chow et al., "Towards a System for Automatic Facial Feature Detection," Pattern Recognition vol. 26, No. 12, pp. 1739-1755, 1993.
U.S. Appl. No. 12/792,498, filed Jun. 2, 2010.
U.S. Appl. No. 12/875,372, filed Sep. 3, 2010.
Cui et al., "A Fast and Robust Iris Localization Method Based on Texture Segmentation," 8 pages, 2004.
Cui et al., "An Appearance-Based Method for Iris Detection," 6 pages, 2004.
Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.
Cui et al., "An Iris Image Synthesis Method Based on PCA and Super-Resolution," IEEE Computer Society, Proceedings of the 17th International Conference on Pattern Recognition, 6 pages, Aug. 23-26, 2004.
Cui et al., "An Iris Recognition Algorithm Using Local Extreme Points," Biometric Authentication, First International Conference, ICBA 2004, Hong Kong, China, 10 pages, Jul. 15-17, 2004.
Cula et al., "Bidirectional Imaging and Modeling of Skin Texture," Proceedings of Texture 2003, 6 pages, Oct. 17, 2003.
Cula et al., "Bidirectional Imaging and Modeling of Skin Texture," IEEE Transactions on Biomedical Engineering, vol. 51, No. 12, pp. 2148-2159, 2004.
Cula et al., "Compact Representation of Bidirectional Texture Functions," Proceedings of IEEE Computer Societ Conference on Computer Vision and Pattern Recognition 2001, 8 pages, 2001.
Cula et al., "Skin Texture Modeling," International Journal of Computer Vision 2004, 34 pages, 2004.
Dabov et al., "Image Denoising by Sparse 3-D Transform-Domain Collaborative Filtering," IEEE Transactions on Image Processing, vol. 16, No. 8, pp. 2080-2095, Aug. 2007.
Dabov et al., "Image Restoration by Spars 3D Transform Collaborative Filtering," SPIE vol. 6812 681207-1, 12 pages, 2008.
Daugman, "Results From 200 Billion Iris Cross-Comparisons," University of Cambridge Computer Laboratory, Technical Report, No. 635, 8 pages, Jun. 2005.
Daugman, "High Confidence Visual Recognition of Persons by a Test of Statistical Independence," IEEE Transactions on Pattern Analysis and Machine Intelligence, vol. 15, No. 11, pp. 1148-1161, 1993.
Daugman, "How Iris Recognition Works," IEEE 2002 International Conference on Image Processing, vol. I of III, 6 pages, Sep. 22-25, 2002.
Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.
Du et al., "A One-Dimensional Approach for Iris Identification," 11 pages, prior to Jan. 25, 2006.
Fooprateepsiri et al., "A Highly Robust Method for Face Authentication," IEEE 2009 First Asian Conference on Intelligent Information and Database Systems, pp. 380-385, 2009.
Fooprateepsiri et al., "Face Verification Base-On Hausdorff-Shape Context," IEEE 2009 Asia Conference on Informatics in Control, Automation and Robotics, pp. 240-244, 2009.
Forstner et al., "A Metric for Covariance Matrices," 16 pages, prior to Jun. 11, 2010.
Gan et al., "Applications of Wavelet Packets Decomposition in Iris Recognition," LNCS vol. 3832, pp. 443-449, 2005.
Guo et al., "A System for Automatic Iris Capturing," Mitsubishi Electric Research Laboratories, Inc., 10 pages, 2005.
Guo, "Face, Expression, and Iris Recognition Using Learning-Based Approaches," 132 pages, 2006.

Hampapur et al., "Smart Surveillance: Applications, Technologies and Implications," IEEE, 6 pages, Dec. 15-18, 2003.
Hamza et al., "Standoff Iris Recognition Usin Non-Iterative Polar Based Segmentation," Proceedings of SPIE vol. 6944, 8 pages, 2008.
Hanna et al., "A System for Non-Intrusive Human Iris Acquisition and Identification," IAPR Workshop on Machine Vision Applications, pp. 200-203, Nov. 12-14, 1996.
http://en.wikipedia.org/wiki/Radon_transform, "Radon Transform," 5 pages, printed May 14, 2010.
http://www.newscientisttech.com/article/dn11110-invention-covert-iris-sc, "Invention: Covert Iris Scanner," 3 pages, printed Feb. 8, 2007.
Huang et al., "Iris Model Based on Local Orientation Description," 5 pages, prior to Jan. 25, 2006.
Huang et al., "An Efficient Iris Recognition System," IEEE Proceedings of the First International Conference on Machine Learning and Cybernetics, Beijing, pp. 450-454, Nov. 4-5, 2002.
Ivins et al., "A Deformable Model of the Human Iris for Measuring Small Three-Dimensional Eye Movements," Machine Vision and Applications, vol. 11, pp. 42-51, 1998.
Jalaja et al., "Texture Element Feature Characterizations for CBIR," IEEE, pp. 733-736, 2005.
Kadyrov et al., "The Trace Transform and Its Applications," IEEE Transactions on Pattern Analysis and Machine Intelligence, vol. 23, No. 8, pp. 811-828, Aug. 2001.
Kadyrov et al., "The Trace Transform as a Tool to Invariant Feature Construction," 3 pages, prior to Jun. 11, 2010.
Kalka et al., "Image Quality Assessment for Iris Biometric," Proc. of SPIE vol. 6202 62020D, 11 pages, 2006.
Kang et al., "Improved Dual Action Contour for Iris Recognition," 10 pages, prior to Jun. 11, 2010.
Kawaguchi et al., "Detection of Eyes from Human Faces by Hough Transform and Separability Filter," IEEE, 4 pages, 2000.
Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.
Kong et al., "Detecting Eyelash and Reflection for Accurate Iris Segmentation," International Journal of Pattern Recognition and Artificial Intelligence, vol. 17, No. 6, pp. 1025-1034, 2003.
Lau et al., "Finding a Small Number of Regions in an Image Using Low-Level Features," Pattern Recognition 35, pp. 2323-2339, 2002.
Li et al., "Appearance Modeling Using a Geometric Transform," IEEE Transactions on Image Processing, 17 pages, 2008.
Li et al., "Appearance Modeling Using a Geometric Transform," Journal Preparation for IEEE Transactions on Image Processing, 30 pages, Nov. 5, 2006.
Ma et al., "Personal Identification Based on Iris Texture Analysis," IEEE Transactions on Pattern Analysis and Machine Intelligence, vol. 25, No. 12, pp. 1519-1533, Dec. 2003.
Ma et al., "Local Intensity Variation Analysis for Iris Recognition," Pattern Recognition, vol. 37, pp. 1287-1298, 2004.
Ma et al., "Video Sequence Querying Using Clustering of Objects' Appearance Models," Advances in Visual Computing Third Annual Symposium, ISVC 2007, 14 pages, 2007.
Masek, "Recognition of Human Iris Patterns for Biometric Identification," 61 pages, 2003.
Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.
Monro et al., "DCT-Based Iris Recognition," IEEE Transactions on Pattern Analysis and Machine Intelligence, vol. 29, No. 4, Apr. 2007.
Noh et al., "A Novel Method to Extract Features for Iris Recognition System," AVBPA 2003, LNCS 2688, pp. 862-868, 2003.
Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.
Oppenheim et al, "The Importance of Phase in Signals," Proceedings of the IEEE, vol. 69, No. 5, pp. 529-541, 1981.
Pamudurthy et al., "Dynamic Approach for Face Recognition Using Digital Image Skin Correlation," Audio and Video Based Person

(56) References Cited

OTHER PUBLICATIONS

Authentication 5$^{th}$ International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.

Phillips et al., "FRVT 2006 and ICE 2006 Large-Scale Results," 56 pages, Mar. 2007.

Porikli et al., "Covariance Tracking Using Model Update Based on Means on Riemannian Manifolds," 8 pages, prior to Jun. 11, 2010.

Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Ross et al., "Segmenting Non-Ideal Irises Using Geodesic Active Contours," IEEE 2006 Biometrics Symposium, 3 pages, 2006.

Shapiro et al., "Pages 556-559 in Book Entitled Computer Vision," Prentice Hall, prior to Jun. 11, 2010.

Sony, "Network Color Camera, SNC-RZ30N (NTSC)," 6 pages, Aug. 2002.

Stillman et al., "A System for Tracking and Recognizing Multiple People with Multiple Cameras," 6 pages, Aug. 1998.

Sun et al., "Robust Encoding of Local Ordinal Measures: A General Framework of Iris Recognition," 13 pages, prior to Jan. 25, 2006.

Sun Et al., "Iris Recognition Based on Non-local Comparisons," Sinobiometrics 2004, LNCS 3338, pp. 67-77, 2004.

Suzaki et al., "A Horse Identification System Using Biometrics," Systems and Computer in Japan, vol. 32, No. 14, pp. 12-23, 2001.

Trucco et al., "Robust Iris Location in Close-up Images of the Eye," Pattern Anal. Applic. vol. 8, pp. 247-255, 2005.

Turan et al., "Trace Transform Based Invariant Object Recognition System," 4 pages, prior to Jun. 11, 2010.

Turk et al., "Eigenfaces for Recognition," Journal of Cognitive Neuroscience, vol. 3, No. 1, 16 pages, 1991.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

Wang et al., "Recent Developments in Human Motion Analysis," Pattern Recognition, vol. 36, pp. 585-601, 2003.

Wei et al., "Robust and Fast Assessment of Iris Image Quality," LNCS vol. 3832, pp. 464-471, 2005.

Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.

Zhi-Hui et al., "Research Iris Serial Images Quality Assessment Method Based on HVS," Proceedings of SPIE, vol. 6034, 6 pages, 2006.

Freeboy, "Adaptive Optics Speeds Up Airport Immigration," Optics.org/ole, 2 pages, Jan. 2009.

http://www.imagine-eyes.com/content/view/100/115/, "INOVEO—Ultra-High Resolution Retinal Imaging with Adaptive Optics," 2 pages, printed Feb. 22, 2010.

\* cited by examiner

SYSTEM FOR IRIS DETECTION, TRACKING AND RECOGNITION AT A DISTANCE

This application is a continuation of co-pending U.S. application Ser. No. 11/382,373, filed May 9, 2006, which claims the benefit of U.S. Provisional Application No. 60/778,770, filed Mar. 3, 2006.

BACKGROUND

The present invention pertains to recognition systems and particularly to biometric recognition systems. More particularly, the invention pertains to iris recognition systems.

U.S. application Ser. No. 11/382,373, filed May 9, 2006, is hereby incorporated by reference. U.S. Provisional Application No. 60/778,770, filed Mar. 3, 2006, is hereby incorporated by reference. U.S. application Ser. No. 11/043,366, filed Jan. 26, 2005, is hereby incorporated by reference. U.S. application Ser. No. 11/275,703, filed Jan. 25, 2006, is hereby incorporated by reference. U.S. application Ser. No. 10/446,521, filed May 27, 2003, is hereby incorporated by reference. U.S. Pat. No. 6,718,049, issued Apr. 6, 2004, is hereby incorporated by reference.

SUMMARY

The invention is a system that incorporates an iris biometrics technology for person recognition (not necessarily cooperating) from afar.

DESCRIPTION

Figure 1:
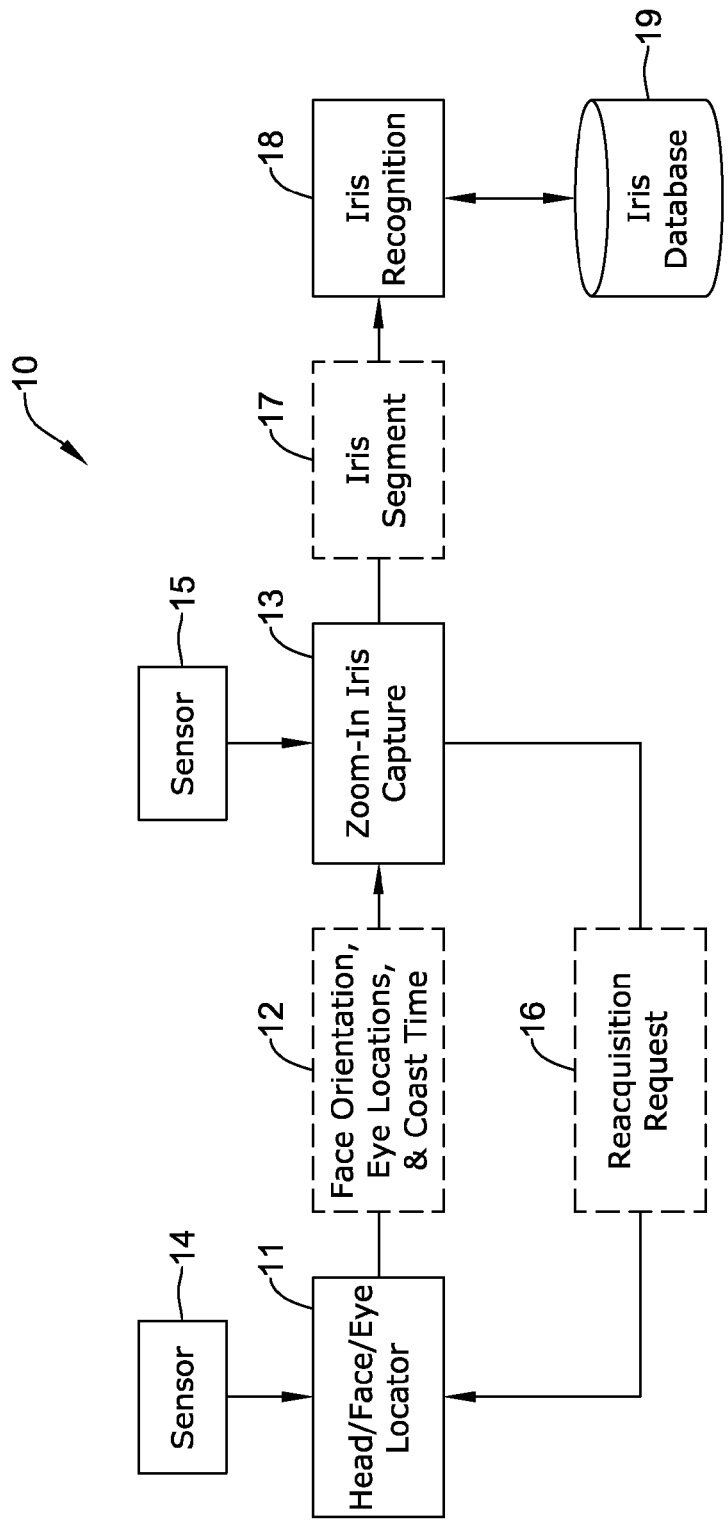
FIG. 1 is an overall diagram of the distant iris detection, tracking and recognition system.

The present system may involve remote iris detection and tracking, remote iris recognition, remote biometrics, non-cooperative iris ID, non-invasive iris recognition and face detection from a stand off range. The invention may have application to identity management, access control, identification, verification, security, surveillance, medical imaging, and so forth.

Current iris recognition (biometrics) technology and devices are limited in their application use because they require actual cooperation by the subject. They also require that the subject places his or her eye or eyes for a few seconds in line with the device scanning window and look inside the device at the imaging source, or at best from a short distance away. This may be sufficient for some access control applications. However, there are applications (e.g., non-cooperative identification, surveillance, and fast access control), which require that iris identification be accomplished from a relatively long distance away.

Various properties and characteristics make iris recognition technology a potentially reliable personal identification tool. This technology may provide uniqueness and genetic independence in identification. The iris of the eye has an extraordinary structure that is unique to each human being. Unlike other well known biometric technologies, such as face-prints and fingerprints, irises are unique to each person and even among genetically identical individuals (i.e., twins). Although the striking visual similarity of identical twins reveals the genetic penetrance of facial appearance, a comparison of genetically identical irises reveals just the opposite for iris patterns. Biomedical literature suggests that iris features are as distinct for each human as fingerprints or patterns of retinal blood vessels. An iris has a data-rich physical structure with sufficient texture to provide adequate discrimination between human subjects. There is no aging effect, that is, there is stability over life of the iris features. Iris recognition technology provides non-invasiveness. The iris is regarded an internal and unique organ, yet is externally visible and can be measured from a distance, using this technique.

From a technical point of view, biometric accuracy may rely significantly on how best the iris is resolved, focused, segmented and extracted. When acquiring iris images, the number of "on-iris" pixels, iris exposure, dynamic range and focus must all be sufficiently precise to produce a high quality image that captures the intricacy of the iris tissue structure. When analyzing iris images of cooperative subjects, the segmentation approach may be a relatively straightforward process of edge detection and circular fitting. However, this is often not the case for stand-off range eye detection and tracking or iris-at-a-distance systems, which often do not receive the cooperation of the subject. In many cases of stand-off range and at-a-distance systems, merely a portion of the iris may be captured due to, for example, closure effect and/or eyelash and eyelid occlusions. Furthermore, given that the subject is not typically asked to cooperate, a tilted head or a rotated iris typically needs also be considered. The present system may extract accurate segments of the iris borders, among other things, in a stand-off range and at-a-distance environment. Computing iris features may use a good-quality segmentation process that focuses on the subject's iris and properly extracts its borders.

The system may detect the head and/or the face from a distance, track the head/face from a distance, track the head/face, locate the eyes in the face when they are presented in a direction of the camera intentionally or unintentionally, and track them. Then a high quality zoom camera may obtain close-ups of the eye, and a smart algorithm may determine when the iris has the best orientation towards the zoom camera, at which point several high quality sequential pictures of the eye/iris may be taken, to perform the iris recognition task.

The system may be based on the following approach operating from a distance. One may include a Tri-Band Imaging™ (TBI) (Honeywell International Inc) camera skin detector. Then specific algorithms may be used to determine if the detected skin is part of the face. This may be accomplished by locating several facial features (eyes, eye brows, nose, mouth, and so forth) and their positions relevant to each other. For skin and features determinations, one may use a commercially available (COTS) face detection and tracking system.

A high quality zoom camera may be used to obtain close-up high resolution images of a rectangular region that contains both eyes. Eye tracking algorithms may be used for iris location within the eye and to determine the "best iris position" with respect to the camera. The "best iris position" may be determined via algorithms by maximizing a function that depends on the key features of the iris and/or the face. At this point of maximization, the zoom camera may take several close-up images of each eye/iris region and pass it on to be processed by commercially available iris recognition algorithms or devices.

FIG. 1 is a block diagram of a stand-off range or at-a-distance iris detection system 10. A head/face/eye region locator or acquisition module 11 may seek out eye locations, face orientation and coast time of an individual that is a subject of inquiry. The eye locations, face orientation and coast time information, as shown by block 12, may go to a zoom-in iris capture module 13. The head/face/eye locator 11 may perform its operations with one or two sensors or cameras. There may be a cueing sensor 14 and a zoom sensor 15 collocated, or located at different places. The sensors may be physically one integrated multi-function sensor. If iris capture is not successful, then there may be a reacquisition request signal 16 that goes back to the head/face/eye locator module 11 so that the module may again seek out eye locations, face orientation, and coast time, of the subject individual to be forwarded to the zoom-in-iris capture module 13 for another capture of the individual's iris. If the capture is successful, then the resultant capture of the iris may be an iris segment 17 that may go on to an iris recognition module 18. The iris recognition module 18 may match the iris segment 17 with an iris segment in an iris database 19. The matching may a one-to-one verification of an identity of the subject individual, or it may be a one-to-many search to possibly identify the individual with a match in the database 19. Or the iris recognition module 18 may enter the iris segment 17 as information about the subject individual into the iris database 19 for reasons of cataloging for later use in cases of identification or verification of the individual.

Figure 2:
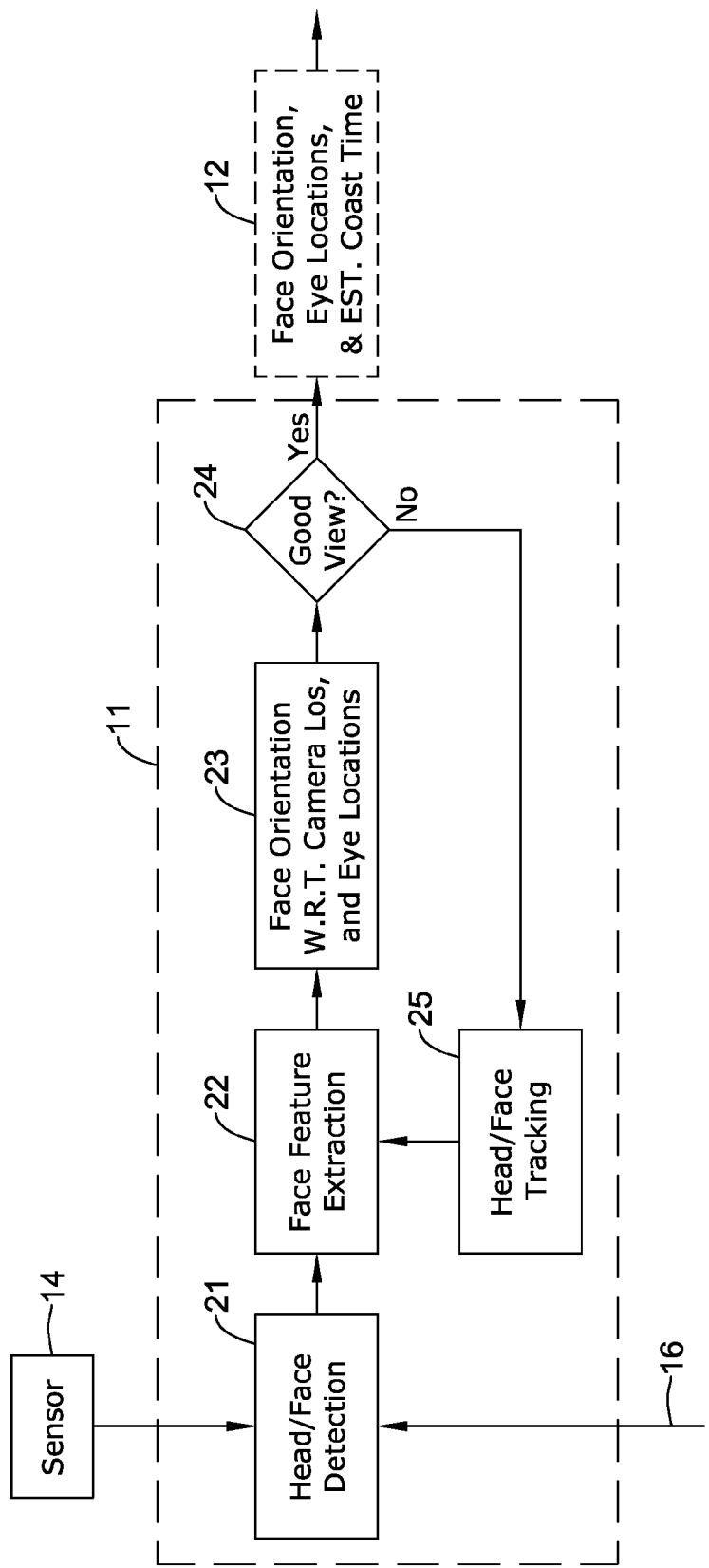
FIG. 2 is a diagram of a head, face and eye region locator of the system in FIG. 1.

FIG. 2 reveals more detail of the head/face/eye region locator or acquisition module 11. The module may start with head/face detection 21. The head/face detection may be performed with a present or future acquisition system, such as the Honeywell Tri-Band Imaging™ (TBI) camera. Other off-the-shelf (COTS) camera or sensor systems using a video and/or an infrared (IR) camera or other imaging techniques may be implemented. With the detected head/face information, face feature extraction 22 may be performed. From this feature or features, information 23 containing face orientation with respect to a camera line-of-sight (LOS) and eye location, may be sent to diamond shaped juncture 24 that asks the question whether the information 23 provides a sufficiently good view. The metrics for determining a good view may include face symmetry and face orientation based on facial features. If the answer to the good view question is no, then a signal may go to a head/face tracking module 25 which re-initiates the face feature extraction 22. The head/face tracking module 25 also may provide the time to coast in the "zoom-in iris capture" continuous mode, before the tracking is reinitiated. If the answer to the good view question is no, then one may get the face orientation, eye location, and estimate coast time information 12 which is provided on to the zoom-in iris capture module 13.

Figure 3:
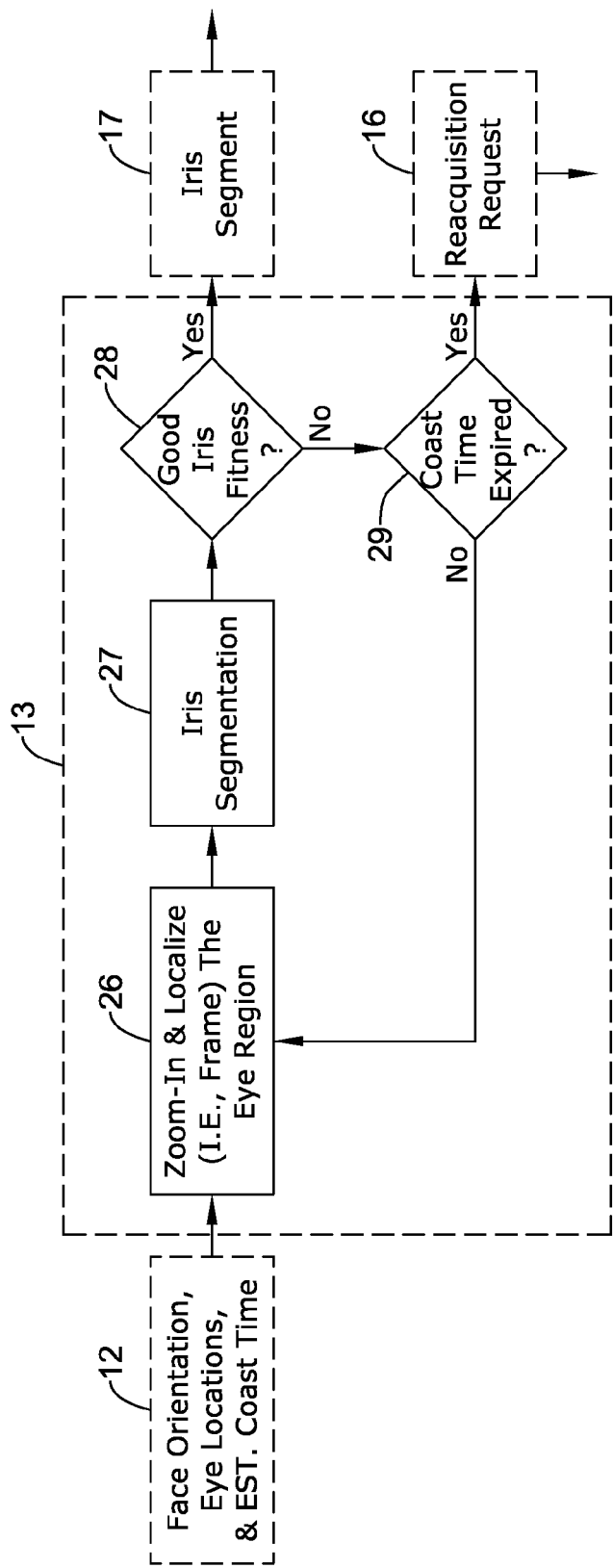
FIG. 3 is a diagram of a zoom-in and iris capture stage of the system in FIG. 1.

FIG. 3 shows some detail of the zoom-in and iris capture section or module 13. After receipt of the face orientation, eye location, and estimate coast time information 12, there may be a mechanism for providing zoom-in and a localizing (i.e., framing) of the eye region in module 26. From this information, an iris segmentation 27 may be performed. The activities for mechanisms or modules 26 and 27 may be accomplished with COTS technologies. The iris segmentation 27 may be reviewed at a diamond shaped juncture 28 to consider the question as to whether there is good iris fitness. If the answer is no, then a question at a diamond shaped juncture 29 is whether the coast time has expired. If the answer is yes, then a reacquisition request 16 may be initiated back to the head/face/eye locator module 11 in FIG. 1. There, the approach may be repeated in accordance with FIG. 1, as described herein. If the answer is no at juncture 29, then the action of zoom-in and localize the eye region module 26 may be reinstituted and its results forwarded on to the iris segmentation module 27 and to juncture 28 for determining whether there is a good iris fitness of a segment. If the answer at juncture 28 is yes, then the iris segment 17 may be provided to the iris recognition module 18 for the one-to-one verification of a person or the one-to-many identification of a person in conjunction with the database 19 of information. Or the iris segment 17 may be part of an acquisition of a non-cooperative (or cooperative) subject individual into the database 19.

The iris segmentation algorithms can be of any type which faithfully outlines the imaged iris presented to them. One such algorithm is one developed by Honeywell operating in the polar domain and is described herein.

Conducting the segmentation in the polar domain may lead to a more efficient and faster process to execute not only the segmentation, but also calibration, and noise removal, all in one step to generate a feature map for the encoding step.

The system may provide reliable calibration and an efficient segmentation (i.e., localization) of the stand-off range or at-a-distance iris detection, resulting in better extraction of the iris features that may eventually be converted into a numeric code. Conversion of an iris annular image into a numeric code that can be easily manipulated may be essential to iris recognition. The iris codes may be compared with previously generated iris codes for verification and identification purposes.

The orientation of head and eyes may result into different perspective of views of the iris circular shape. The captured shapes of the iris are usually apart from being circles or ellipses due to the orientation, tilt and slant angles.

In an illustrative example, the iris biometric approach may include using a POSE™ (i.e., Honeywell International Inc.—polar segmentation) technique to move virtually immediately the analysis to a polar domain and execute a 1-D segmentation of the iris borders, using one or more symmetry properties to detect one or more non-occluded areas of the iris—non-symmetric regions can correspond to areas partially covered by eyelashes, eyelids, and so forth (thus asymmetric). In some cases, one may limit the analysis to those segments where the iris and the sclera are detected relative to their symmetry. The sclera may be regarded as a tough white fibrous outer envelope of tissue covering the entire eyeball except the cornea. Once an orientation is detected, nominal angles with the least likelihood of distortions (i.e., occluded or deformed due to orientation) may be identified by, for example, estimating the ellipse parameters from nominal angles, and computing a calibration factor. A rotated ellipse detection technique that uses overlapping variable circles to detect the iris borders modeled as elliptic or irregular shapes rather than circles, and/or a least square fitting may be used to estimate the elliptic parameters and orientation. Mixture modeling may be used to handle variation in the iris textures.

The iris inner and outer boundaries of iris may be approximated by ellipses than circles of irregular shapes using snake delineation. However, the two ellipses are usually not concentric. One may characterize the shape and texture of the structure of the iris having a large number of interlacing blocks such as freckles, coronas, furrows, crypts, and stripes. The outer boundaries of the iris may be captured with irregular edges due to presence of eyelids and eyelashes. Taken in tandem, these observations suggest that iris localization may be sensitive to a wide range of edge contrasts.

The present system is well suited for high-security access control involving stand-off range and at-a-distance biometrics applications where less control is exercised on subject positioning and/or orientations. Such operations may include, for example, subjects captured at various ranges from the acquisition device, and/or may not have the subjects eye(s) directly aligned with the imaging equipment. Usually, for such applications, it is difficult to implement the level of control required by most of the existing art to enable reliable iris recognition. The system may help cope with asymmetry in acquired iris images, and may further help under uncontrolled environments as long as some of the iris annular is visible. The system may solve the asymmetry problem associated with image acquisition without the collaboration of the subjects and operate under uncontrolled operations as long as some of the iris annular is visible.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A method for iris detection at a distance of non-cooperative or cooperative subjects, comprising:
    capturing an image of a face of a subject;
    processing the image of the face of the subject to identify an eye region that contains at least one eye of the subject;
    capturing an image of the identified eye region of the subject using an imaging device;
    determining a iris rotational orientation relative to the imaging device of the iris of the at least one eye, including determining whether the iris rotational orientation provides a best iris rotational orientation towards the imaging device, the best iris rotational orientation being determined by algorithms that maximize a function that depends on key features of the iris to provide a point of maximization; and
    re-acquiring an image of the eye region if it is determined that the iris rotational orientation does not provide the best iris rotational orientation towards the imaging device.

2. The method of claim 1, wherein the determining step includes processing the image of the identified eye region to determine if the iris rotational orientation of the subject does not provide the best iris rotational orientation.

3. The method of claim 1, wherein the determining step includes processing the image of the face of the subject to determine if the face rotational orientation of the subject, and thus the iris rotational orientation, does not provide the best iris rotational orientation.

4. The method of claim 1, wherein the determining step includes processing the image of the face to determine if the face rotational orientation of the subject does not provide the best iris rotational orientation, and processing the image of the identified eye region to determine if the iris rotational orientation of the subject does not provide the best iris rotational orientation.

5. The method of claim 1, wherein the image of the face is captured using a multi-band camera.

6. The method of claim 1, wherein the image of the identified eye region is captured using a zoom camera.

7. The method of claim 1, further comprising extracting features of an iris of the subject by determining inner and outer borders of the iris in the image of the identified eye region and doing a one dimensional segmentation of the iris in a polar domain.

8. The method of claim 7, further comprising converting the features of the iris into an iris numeric code.

9. The method of claim 8, further comprising comparing the iris numeric code with previously generated iris numeric codes for verification and identification of the iris numeric code or for entry of the iris numeric code into a database.

\* \* \* \* \*